United States Patent
Hundley et al.

(10) Patent No.: US 10,946,600 B1
(45) Date of Patent: Mar. 16, 2021

(54) COMPOSITE STRUCTURE REPAIR METHODS INCORPORATING A LATTICE CORE MATERIAL

(71) Applicant: HRL Laboratories, LLC, Malibu, CA (US)

(72) Inventors: Jacob M. Hundley, Newbury Park, CA (US); Eric C. Clough, Santa Monica, CA (US); Zak C. Eckel, Calabasas, CA (US); David Page, Foothill Ranch, CA (US); Sophia S. Yang, Lynnwood, WA (US)

(73) Assignee: HRL Laboratories, LLC, Malibu, CA (US)

( * ) Notice: Subject to any disclaimer, the term of this patent is extended or adjusted under 35 U.S.C. 154(b) by 861 days.

(21) Appl. No.: 15/690,229

(22) Filed: Aug. 29, 2017

(51) Int. Cl.
| | |
|---|---|
| *B29C 73/02* | (2006.01) |
| *B29C 73/10* | (2006.01) |
| *B29C 73/24* | (2006.01) |
| *B29K 105/04* | (2006.01) |
| *B29L 31/60* | (2006.01) |

(52) U.S. Cl.
CPC .............. *B29C 73/02* (2013.01); *B29C 73/10* (2013.01); *B29C 73/24* (2013.01); *B29K 2105/04* (2013.01); *B29L 2031/608* (2013.01)

(58) Field of Classification Search
CPC ......... B29C 73/00; B29C 73/02; B29C 73/10; B29C 73/24; B29K 2105/04; B29L 2031/608
See application file for complete search history.

(56) References Cited

U.S. PATENT DOCUMENTS

| | | | |
|---|---|---|---|
| 4,855,182 A * | 8/1989 | Ondrejas et al. | |
| 7,382,959 B1 | 6/2008 | Jacobsen | |
| 8,969,843 B2 * | 3/2015 | Ohba | H01L 45/085 257/2 |
| 2004/0028877 A1* | 2/2004 | Itoh et al. | |
| 2014/0120298 A1* | 5/2014 | Thiagarajan | B29C 73/06 428/99 |
| 2014/0252674 A1* | 9/2014 | Hundley | B32B 7/02 264/221 |
| 2014/0295123 A1* | 10/2014 | Mizuno | B64C 1/12 428/63 |

(Continued)

OTHER PUBLICATIONS

Composite Repair, Hexcel Composites, Apr. 1999, pp. 1-13, Publication No. UTC 102.

*Primary Examiner* — Nathan H Empie
(74) *Attorney, Agent, or Firm* — Lewis Roca Rothgerber Christie, LLP

(57) ABSTRACT

A method for repairing a composite structure. A damaged portion of a first facesheet of the structure is removed, forming a hole in the first facesheet. A damaged portion of the underlying core is removed to form a cavity in the sandwich. If the second facesheet is damaged, the damaged section is removed, and covered and sealed with a facesheet repair section. If the core material is an open-cell material, a dam is formed around the perimeter of the cavity, to act as a barrier between the cavity and the core material. The cavity is at least partially filled with a photomonomer resin, which then is illuminated through a mask with collimated light to form a truss structure in the cavity. Residual photomonomer resin is removed, and a facesheet repair section is bonded over the hole in the first facesheet.

22 Claims, 20 Drawing Sheets

(56) References Cited

U.S. PATENT DOCUMENTS

| | | | | |
|---|---|---|---|---|
| 2015/0090392 A1* | 4/2015 | Bertrand | .............. | G05B 19/401 |
| | | | | 156/64 |
| 2015/0273761 A1* | 10/2015 | Safai | .................... | B23K 26/352 |
| | | | | 156/64 |
| 2015/0307044 A1* | 10/2015 | Hundley | ............. | B29C 35/0894 |
| | | | | 293/120 |

* cited by examiner

COMPOSITE STRUCTURE REPAIR METHODS INCORPORATING A LATTICE CORE MATERIAL

CROSS-REFERENCE TO RELATED APPLICATION(S)

The present application is related to U.S. Pat. No. 7,382,959, issued on Jun. 3, 2008, entitled "OPTICALLY ORIENTED THREE-DIMENSIONAL POLYMER MICROSTRUCTURES", ("the '959 Patent"), the entire content of which is incorporated herein by reference.

FIELD

One or more aspects of embodiments according to the present invention relate to composite structures, and more particularly to composite structure repair methods incorporating a lattice core material.

BACKGROUND

Given their lightweight, highly structurally-efficient nature, composite and sandwich designs have found applicability on a variety of aerospace and automotive platforms. Regardless of the application however, it is anticipated that a sandwich structure may sustain damage to either the facesheets or the core over the operational life of the platform of which the sandwich structure forms a part. This may be due to the location of the sandwich structures (wing tips, rotor blades, etc.) as well as the propensity for unintentional damage due to inspection or maintenance common to some structures (tool drops, over-torqued fasteners, etc.).

Thus, there is a need for efficient repair and sustainment methods for sandwich structures.

SUMMARY

Aspects of embodiments of the present disclosure are directed toward a method for repairing a composite sandwich structure. A damaged portion of a first facesheet of the structure is removed, forming a hole in the first facesheet. A damaged portion of the underlying core is removed to form a cavity in the sandwich. If the second facesheet is damaged, the damaged section is removed, and covered and sealed with a facesheet repair section that may be formed from the same material as the original facesheets. If the core material is an open-cell material, a dam is formed around the perimeter of the cavity, to act as a barrier between the cavity and the core material. The cavity is at least partially filled with a photomonomer resin, which then is illuminated through a mask with collimated light to form a cellular structure in the cavity. Residual photomonomer resin is removed, and a facesheet repair section is bonded over the hole in the first facesheet.

According to an embodiment of the present invention there is provided a method for repairing a composite structure including a core attached to a first facesheet, the method including: at least partially filling a cavity in the composite structure with a photomonomer resin, the cavity including a void in the core and a hole in the first facesheet, the hole opening into the void; and exposing the photomonomer resin to collimated light projected through a mask having a plurality of apertures to form a core repair section including a plurality of waveguide members that interpenetrate each other at a plurality of nodes to form a continuous material.

In one embodiment, the exposing of the photomonomer resin to collimated light includes exposing the photomonomer resin to collimated light from three sources of collimated light.

In one embodiment, the method includes, before at least partially filling the cavity in the sandwich structure with the photomonomer resin, forming a dam around a perimeter of the cavity to form a barrier between the cavity and the core.

In one embodiment, the method includes sealing the dam against a surface of a second facesheet that is bonded to the core opposite the first facesheet.

In one embodiment, the method includes sealing the dam against the first facesheet around a perimeter of the hole in the first facesheet.

In one embodiment, the method includes removing uncured photomonomer resin from the cavity.

In one embodiment, the method includes performing a post-curing operation on the core repair section.

In one embodiment, performing the post-curing operation includes exposing the core repair section to non-collimated ultraviolet light.

In one embodiment, performing the post-curing operation includes heating the core repair section.

In one embodiment, heating the core repair section includes exposing the core repair section to infrared light.

In one embodiment, the method includes bonding a first facesheet repair section to the first facesheet and the core repair section, covering the hole in the first facesheet.

In one embodiment, bonding the first facesheet repair section to the first facesheet includes bonding a pre-cured facesheet repair section to the first facesheet and the core repair section.

In one embodiment, the pre-cured facesheet repair section is a pre-cured thermosetting polymer matrix composite facesheet repair section.

In one embodiment, the bonding of the first facesheet repair section on to the first facesheet includes: laying an uncured thermosetting polymer matrix composite facesheet repair section on the first facesheet on the core repair section; and curing the thermosetting polymer matrix composite facesheet repair section in place.

In one embodiment, the method includes performing a post-curing operation on the core repair section, wherein the performing of the post-curing operation and the curing of the thermosetting polymer matrix composite facesheet repair section include concurrently heating the core repair section and the thermosetting polymer matrix composite facesheet repair section.

In one embodiment, the core includes, as a major component, a material selected from the group consisting of honeycombs, open cell foams, and closed cell foams.

In one embodiment, the method includes, before at least partially filling the cavity in the sandwich structure with the photomonomer resin: removing damaged facesheet material and removing damaged core material to form the cavity.

In one embodiment, the core of the composite structure is sandwiched between the first facesheet and a second facesheet, and wherein the removing of the damaged facesheet material includes: removing damaged facesheet material from the first facesheet; removing damaged material from the core to form the void; and removing damaged facesheet material from the second facesheet, to form a hole in the second facesheet opening into the void.

In one embodiment, the method includes bonding a second facesheet repair section on to the second facesheet to cover and seal the hole in the second facesheet.

In one embodiment, the bonding of the second facesheet repair section on to the second facesheet includes bonding a pre-cured facesheet repair section on to the second facesheet.

In one embodiment, the pre-cured facesheet repair section is a pre-cured thermosetting polymer matrix composite facesheet repair section.

In one embodiment, the bonding of the second facesheet repair section on to the second facesheet includes: laying an uncured thermosetting polymer matrix composite facesheet repair section on the second facesheet; and curing the thermosetting polymer matrix composite facesheet repair section in place.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of sandwich structure repair methods incorporating a lattice core material provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Sandwich structures, which may consist of two thin, lightweight facesheets connected by a low density reinforcing core, offer a sizeable mass reduction with equivalent flexural and torsional rigidity as related art stiffened plate designs. In a sandwich configuration, the facesheets bear most or all of the in-plane loads while the core serves to carry the shear loads and increase the effective moment of inertia of the structure.

Embodiments of the present invention include methods of repair, in which a discrete truss or lattice structure formed from self-propagating photopolymer waveguides is integrated with the facesheets and core of the sandwich. These repair methods mitigate damage to the sandwich and allow for residual load carrying capability even after local failure has occurred. The use of a three-dimensional lattice formed from self-propagating waveguides may enable unique repair configurations that may not be possible with other lightweight core architectures (e.g. honeycombs or foams).

Related art methods for repairing cellular sandwich structure cores may require excising the damaged section followed by secondarily bonding of an undamaged section of core into the volume previously occupied by the damaged core. In this "drill and fill" approach, the undamaged section of core simply fills the previously damaged volume and has minimal ability to transfer shear or in-plane loads with the surrounding, original core structure. As such, these related art methods offer an improvement over the load carrying capability of the damaged sandwich panel, but they may fail to approach the load carrying capability of the undamaged panel due to the lack of load transfer between the undamaged and repair sections of the core.

Embodiments of the present invention address the limitations of prior art repair methods by forming an in situ repair which can be structurally connected to the original, undamaged core sections. By forming this structural connection, the repaired section of the panel may greatly exceed the load carrying capability of the damaged section and may even approach the load carrying capability of the original, undamaged sandwich structure.

Figure 1:
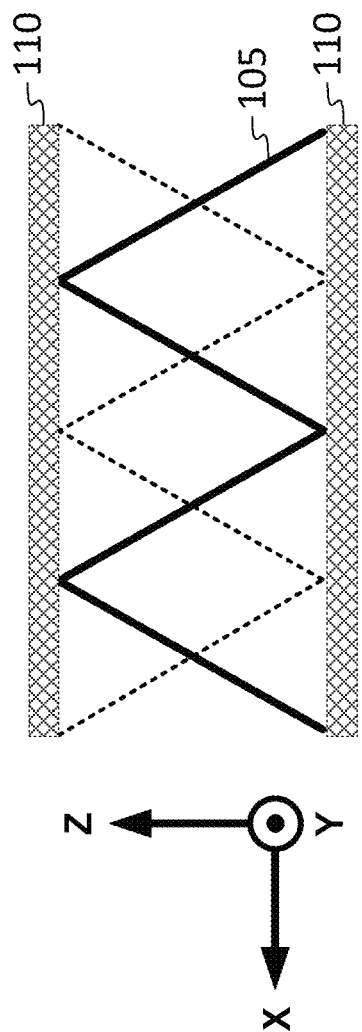
FIG. 1 is a schematic illustration of a side or cross-sectional view of a sandwich structure, according to an embodiment of the present invention.

Some embodiments of the present invention pertain to a repair method for sandwich structures which have sustained damage to one or more of the sandwich facesheets as well as the core. Referring to FIG. 1, in some embodiments, the core 105 is a reinforcing cellular core composed of a three-dimensional truss or lattice architecture formed from a plurality of interconnecting photopolymer waveguides. The core 105 is sandwiched between two facesheets 110. In other embodiments, the core may be composed of a truss or lattice architecture with a different constituent (e.g. other thermoplastic polymer, thermosetting polymer, metal, ceramic, and composite or hybrid material) or a commercially available cellular material (e.g. honeycomb, open cell foam or closed cell foam).

For the purposes of this disclosure, damage refers to any inelastic deformation of the structure resulting in a loss in the residual static or dynamic load-carrying capability of the structure. Such damage may occur as a result of normal operation, hygrothermal conditioning, low or high velocity impact, manufacturing defects or other similar conditions.

Figure 2A:
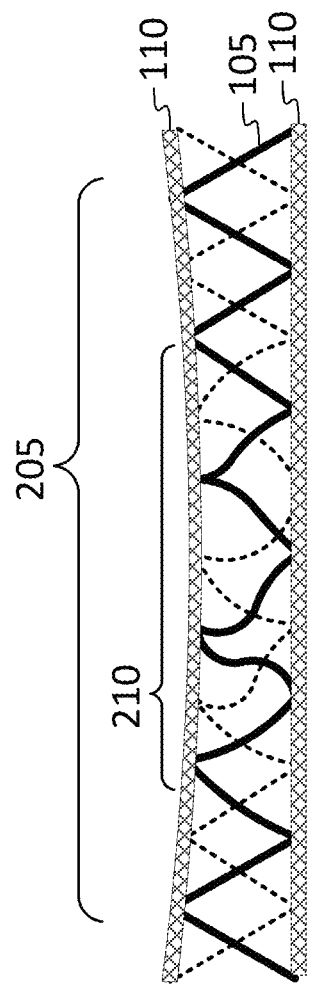
FIG. 2A is a schematic illustration of a sandwich structure with single-sided damage, according to an embodiment of the present invention.
Figure 2B:
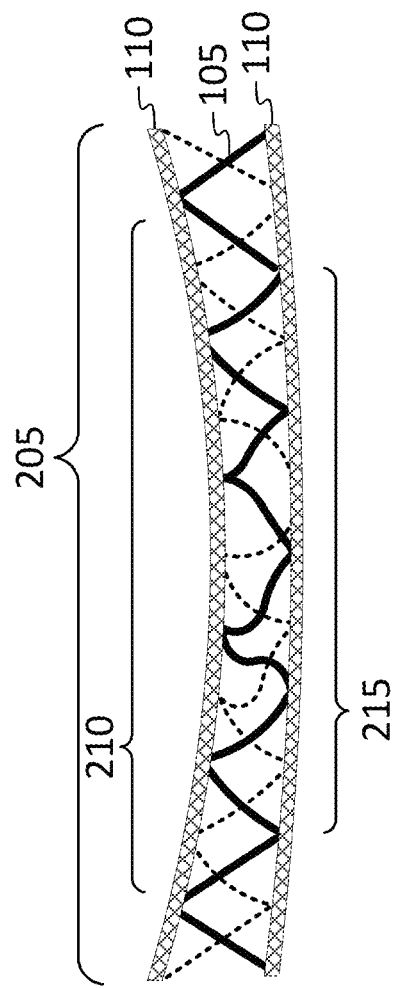
FIG. 2B is a schematic illustration of a sandwich structure with double-sided damage, according to an embodiment of the present invention.

Referring to FIGS. 2A and 2B, in the present disclosure, damage to the sandwich core is classified into two categories: single-sided damage (FIG. 2A) and double-sided damage (FIG. 2B). In the single-sided case, damage occurs within a first facesheet of the sandwich facesheets (e.g., within a damage volume 205 in the first facesheet) and in the core (e.g., within a damage volume 210 in the core) but does not propagate to the second sandwich facesheet. Conversely, in the double-sided repair case, damage occurs within all constituents of the sandwich structure, i.e., within a damage volume 205 in the first facesheet, within a damage volume 210 in the core, and within a damage volume 215 in the second facesheet. Damage which is localized solely within the core and not the facesheets (i.e. as a result of a manufacturing defect) is considered single-sided damage for the purposes of this disclosure.

Repair methods to mitigate the deleterious impact of these damage states on the strength and durability of the sandwich structure are outlined in this disclosure. In each case, the repaired section of the core incorporates a three-dimensional truss or lattice architecture formed from a plurality of self-propagating photopolymer waveguides. The original (undamaged) sandwich core need not be formed from the same material and architecture. In one embodiment of this invention, hereafter termed the "in situ" repair method, the photopolymer lattice is formed directly inside the open volume of the sandwich structure after removal of the damaged core section. This direct formation approach allows for coupling between the repair and the surrounding sections of the core for shear load transfer and improved post-repair strength. The following sections detail how this process may be used to repair the single- and double-sided damage states depicted in FIGS. 2A and 2B, and the advantages of these processes over related art methods.

For single-sided damage (FIG. 2A), the first act in the process is removal of the damaged core and facesheet volumes. Due to the random nature and severity of damage, these volumes may be irregularly shaped and unequal (e.g., there may be more damage within the facesheet than within the core). In related art processes, when pre-formed core materials are used for repair (e.g. honeycomb or foam) the excised damage zone may be extended such that it forms a regular, easily replicable geometry (e.g., a rectangle or circle). While this may simplify the repair section manufacturing, it may degrade the residual load-carrying capability of the sandwich structure due to unnecessary removal and replacement of material. In some embodiments, a hole is cut in the first facesheet (e.g., using a power tool such as a hole saw or jig saw), and the damaged core material is removed (e.g., using a hand tool such as tin snips), leaving a void in the core.

Figure 3A:
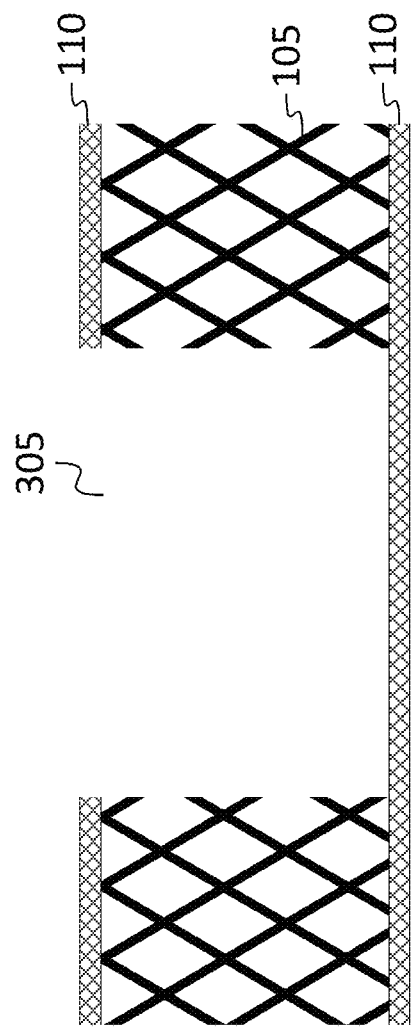
FIG. 3A is a schematic illustration of an intermediate product in a sandwich structure repair method, according to an embodiment of the present invention.
Figure 3B:
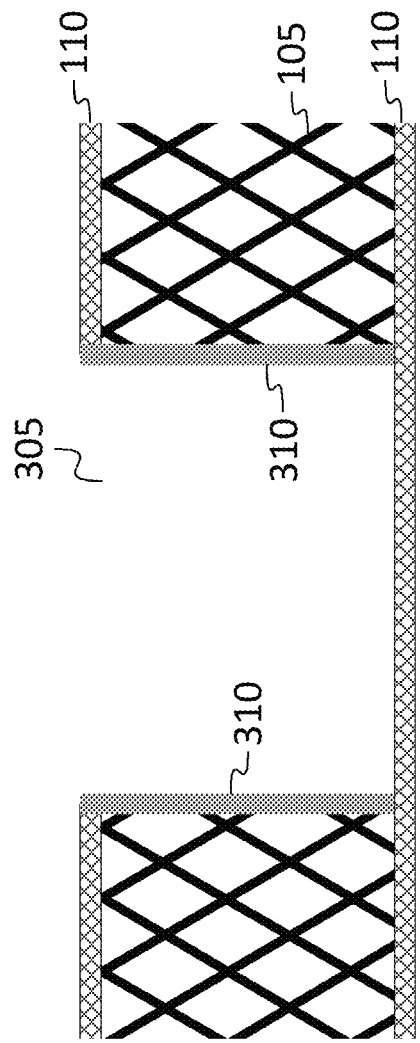
FIG. 3B is a schematic illustration of an intermediate product in a sandwich structure repair method, according to an embodiment of the present invention.

The in situ repair method circumvents these limitations and enables the repaired core section to be formed net-shape directly within the damaged volume, thus reducing or minimizing the amount of material which must be removed. One embodiment of this in situ repair process is shown schematically in FIGS. 3A-3F. First, the damaged portions of the core and facesheet are removed, as shown in FIG. 3A, leaving a cavity 305. Next, the cavity comprising the core volume to be repaired is sealed against fluid efflux if an open cellular core material (e.g. open cell foam or lattice) was used in the original sandwich design, using a dam 310 as shown in FIG. 3B, which forms a barrier between the cavity and the core. If a closed cell material (e.g. honeycomb or closed cell foam) was used as the original core material, the act of sealing the cavity (as shown in FIG. 3B) is optional. In the case of open cellular materials, sealing off the edges of the cavity may be accomplished by a polymer film, metal foil, composite ply or other equivalent thin and stiff structure. The dam material may be adhered to the boundary of the undamaged core section (i.e. with a pressure-sensitive adhesive or foaming adhesive) but this is not a requirement. In some embodiments the surface of the undamaged core section that faces into the cavity is coated with a photomonomer resin that, when cured, adheres to both the undamaged core section and the dam. Curing of this coating of photomonomer resin may occur during a post-cure operation (described in further detail below). In one embodiment, the dam 310 is also sealed against the undamaged facesheet section, and/or the edge of the hole in the facesheet; this may be accomplished, for example, using exposure of a photosensitive liquid to UV light, film adhesive, liquid adhesive or other suitable barrier seal material.

Figure 3C:
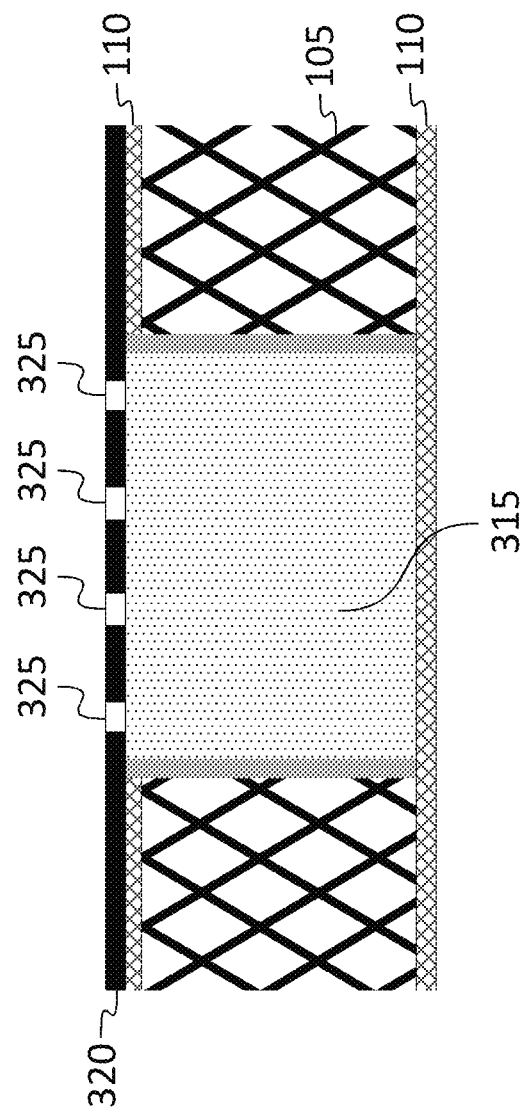
FIG. 3C is a schematic illustration of an intermediate product in a sandwich structure repair method, according to an embodiment of the present invention.

Next, the entire cavity 305 (or "repair volume") is at least partially filled with a UV-curable photomonomer 315 (FIG. 3C). Infiltration of the photomonomer resin may be performed in the same manner for closed cell core materials and for open cell core materials when the cavity is sealed with a dam 310. A mask layer 320 including a regular or irregular pattern of UV-transparent apertures 325 is then placed over the top of (e.g., in contact with) the photomonomer surface, extending over the undamaged section of the repaired facesheet. A UV-transparent spacer layer (e.g. acrylic or glass, not shown in FIG. 3C) may also be placed between the liquid photomonomer resin and the mask (e.g., in contact with the photomonomer resin and with the mask) to control the architecture and/or height of the repaired core section as well as to enable release of the mask layer from the photopolymer after UV exposure. As used herein, a photomonomer, or photomonomer resin, is a liquid that cures to form a solid when exposed to light of a suitable wavelength and suitable radiant energy density, for a suitable period of time.

Figure 3D:
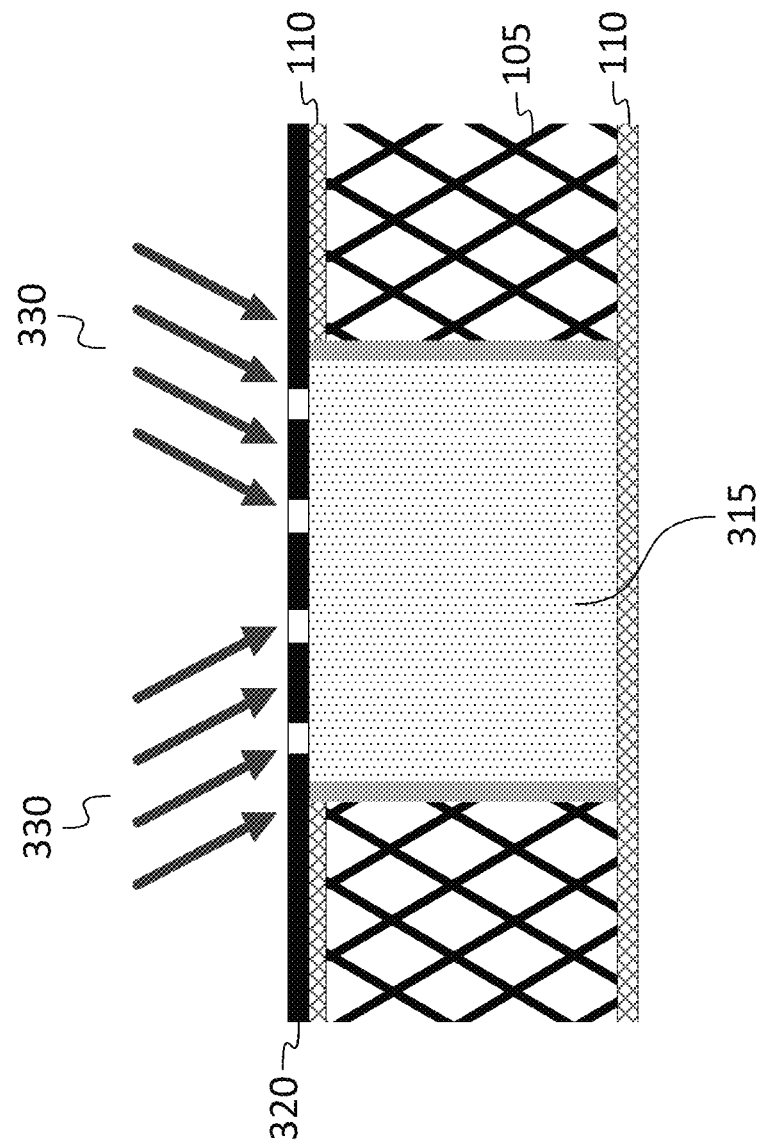
FIG. 3D is a schematic illustration of an intermediate product in a sandwich structure repair method, according to an embodiment of the present invention.
Figure 3E:
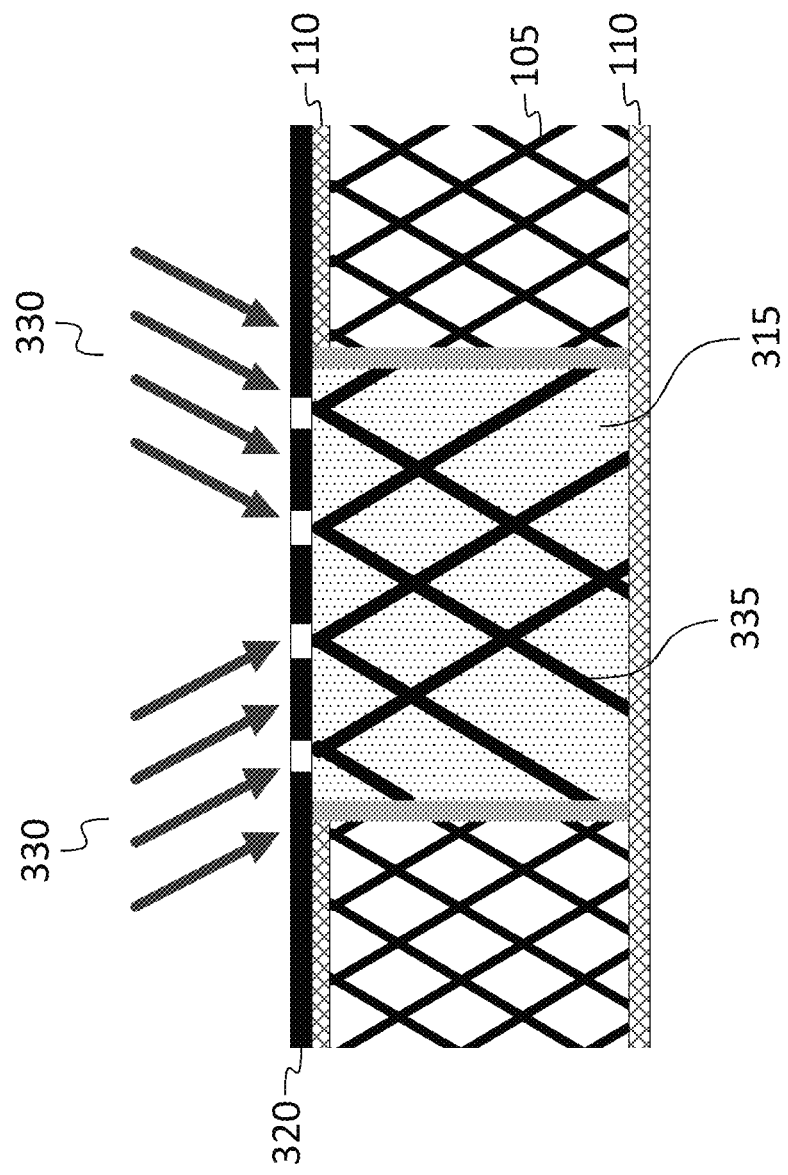
FIG. 3E is a schematic illustration of an intermediate product in a sandwich structure repair method, according to an embodiment of the present invention.

After application of the mask and optional spacer layer(s), the volume of photomonomer is exposed to collimated UV light 330 from a plurality of UV light sources (e.g. UV LEDs, arc-lamps, lasers) at specified orientations (FIG. 3D). For each combination of mask aperture and UV light source, polymerization is induced in the monomer, which changes the local index of refraction. This index change results in a self-focusing effect in which a polymer waveguide forms and propagates in a linear fashion until it reaches a non-reflecting boundary or the intensity of incoming light is insufficient to further polymerize the photomonomer. The confluence of the plurality of self-propagating photopolymer waveguides forms a three-dimensional truss or lattice architecture core structure that includes a plurality of polymer waveguide members interpenetrating each other at a plurality of nodes. The truss or lattice architecture core structure acts as a core repair section 335, fabricated in place, within the repair volume of the core (FIG. 3E). An analogous process is disclosed in the '959 Patent.

When the individual waveguides comprising the truss propagate to the bottom of the repair volume and contact the facesheet, an adhesive bond is formed between the two components. This in situ bond avoids the processing complexity, present in some related art methods, of performing additional secondary bonding operations between the core repair section and the lower facesheet, and allows for efficient load transfer at the interface between the core repair section and the lower facesheet.

Figure 3F:
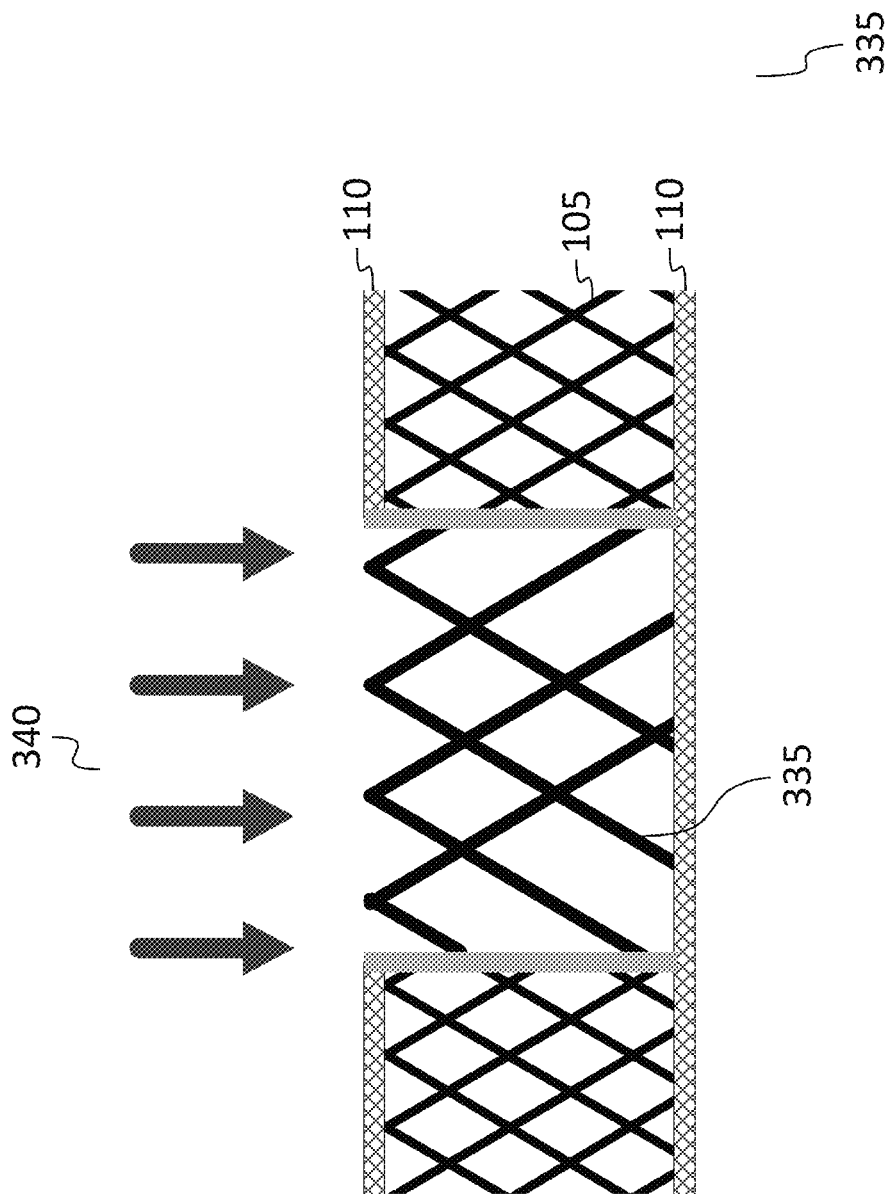
FIG. 3F is a schematic illustration of an intermediate product in a sandwich structure repair method, according to an embodiment of the present invention.

Once the photopolymer truss core repair section 335 is formed, the residual non-polymerized photomonomer 315 is drained from the repair cavity 305 and captured for re-use. At this point, the photopolymer truss that forms the core repair section 335 may be in a partially-cured or "green" state. In one embodiment, conversion to a fully-cured structure is accomplished with a second exposure, to non-collimated, high intensity UV light 340 (FIG. 3F). Alternatively, a thermal post-cure may also be used to fully cross-link the truss structure of the core repair section 335. Because line of sight access to the core is still available at this point, the optional thermal post-cure may be accomplished using localized irradiance by an infrared lamp. Both the UV photocuring and IR thermal curing approaches may avoid the need (present in some related art approaches) to either bring the entire sandwich structure to elevated temperature (which may be costly) or to use low-strength room temperature cure adhesives (which may have limited utility).

Figure 4A:
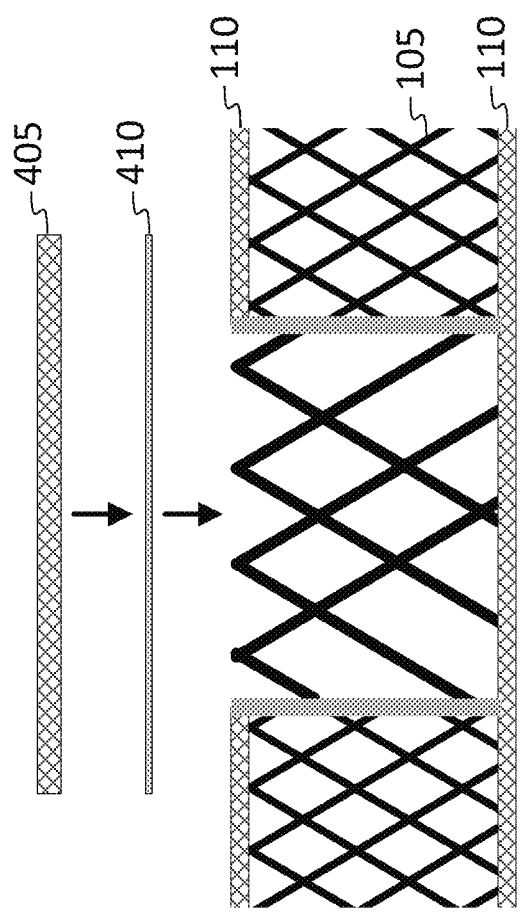
FIG. 4A is a schematic illustration of an intermediate product in a sandwich structure repair method, according to an embodiment of the present invention.
Figure 4B:
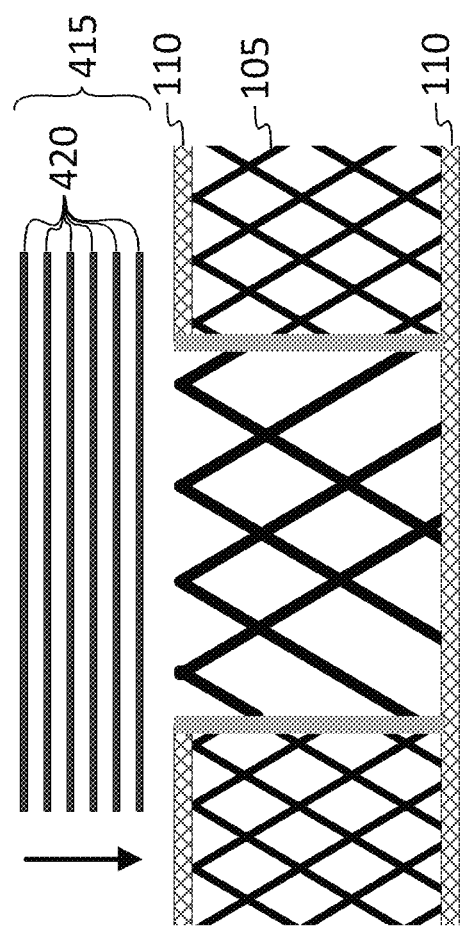
FIG. 4B is a schematic illustration of an intermediate product in a sandwich structure repair method, according to an embodiment of the present invention.
Figure 4C:
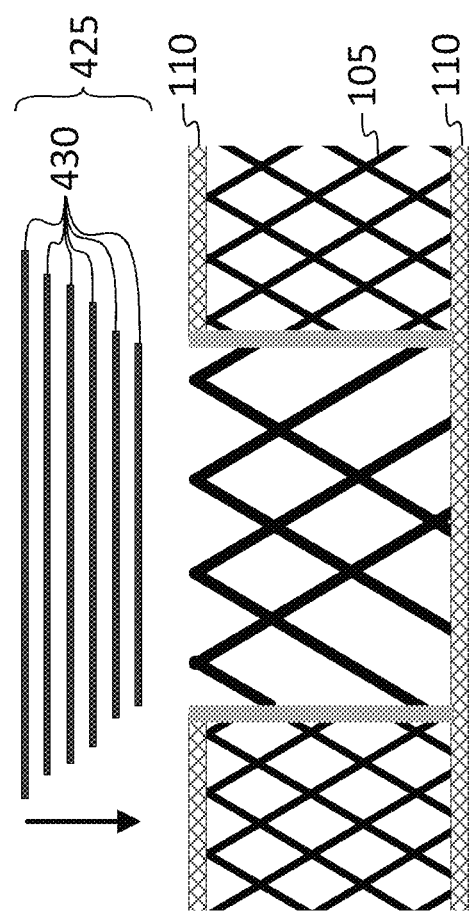
FIG. 4C is a schematic illustration of an intermediate product in a sandwich structure repair method, according to an embodiment of the present invention.

Once the truss structure has been formed and fully cured within the repair volume 305, the damaged facesheet may be repaired to close out the sandwich structure. This facesheet repair may be accomplished either with a facesheet repair section 405 (e.g., a pre-cured composite skin) secondarily bonded, e.g., with an adhesive layer 410, to the exposed core surface and surrounding undamaged facesheet (FIG. 4A) or by laying (or "laying up") and curing the composite skin directly on top of the structure without adhesive using a patch 415, formed from a plurality of uncured plies 420, all having substantially the same dimensions (FIG. 4B) or using a scarf 425 formed from a plurality of uncured plies 430, each having smaller dimensions than the one above it (FIG. 4C). If the composite skin is to be laid and cured onto the core surface, then the composite cure and thermal post-cure of the truss structure may be accomplished simultaneously (i.e., these elements may be co-cured), e.g., by raising the temperature of the entire structure (e.g., to 121° C. (250° F.) in an oven, or with silicone strip heaters).

Methods according to embodiments of the present invention may be used to form net-shape core repair sections 335, i.e., they may be capable of filling arbitrary damage volumes without additional undamaged material removal. Additionally, because of the photo-active nature of the core and in situ bond formation, thermal curing of the repair patch may be avoided, lessening capital equipment requirements in the case of large parts (e.g., rotor blades) or precise parts (e.g., automotive body panels).

Figure 5A:
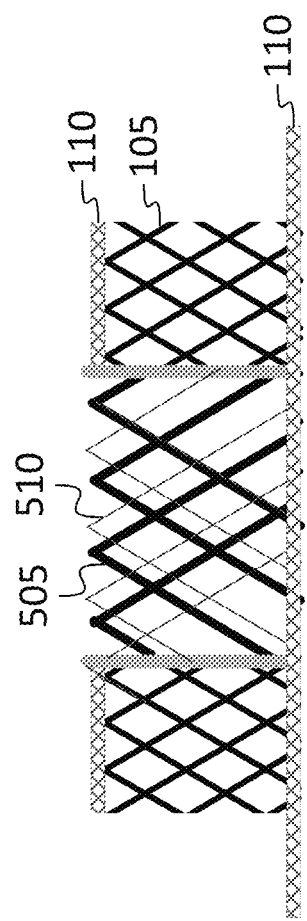
FIG. 5A is a schematic illustration of an intermediate product in a sandwich structure repair method, according to an embodiment of the present invention.
Figure 5A:
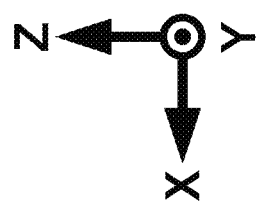
Figure 5B:
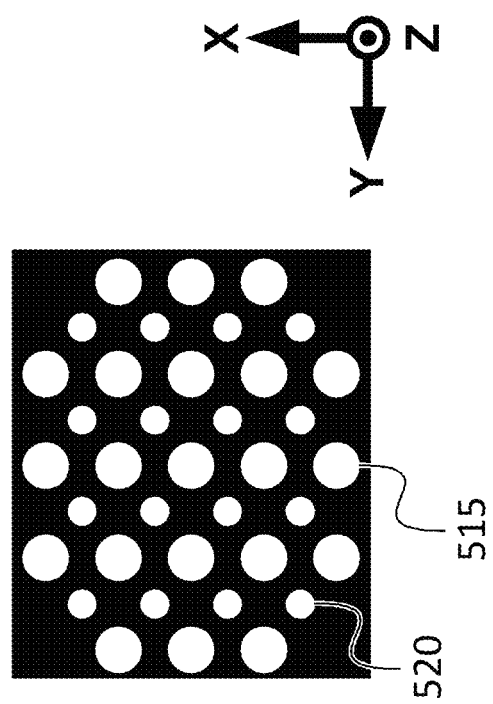
FIG. 5B is a schematic illustration of a a mask for use in a sandwich structure repair method, according to an embodiment of the present invention.

Referring to FIGS. 5A and 5B, the self-propagating photopolymer truss formation process also enables local reinforcement in selected regions of the repair patch. Since the geometry and architecture of the truss repair patch is dictated by the size, spacing and periodicity of apertures in the mask, these dimensions can be controlled to locally add stiffness or strength to critical regions of the repair patch, such as the boundaries between the repaired section and the pre-existing undamaged material. For example, the truss may be functionally graded and may include both thicker truss members 505 and thinner truss members 510, formed (with a mask such as the one of FIG. 5B) as waveguides by light entering larger apertures 515 and smaller apertures 520 respectively.

Figure 6A:
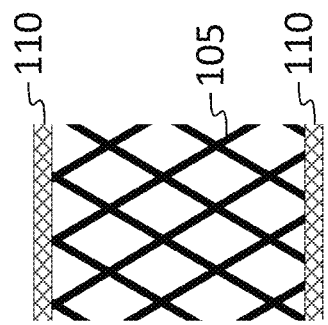
FIG. 6A is a schematic illustration of an intermediate product in a sandwich structure repair method, according to an embodiment of the present invention.
Figure 6A:
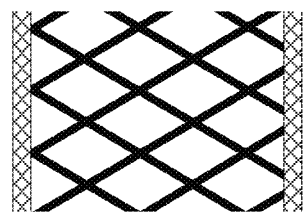
Figure 6B:
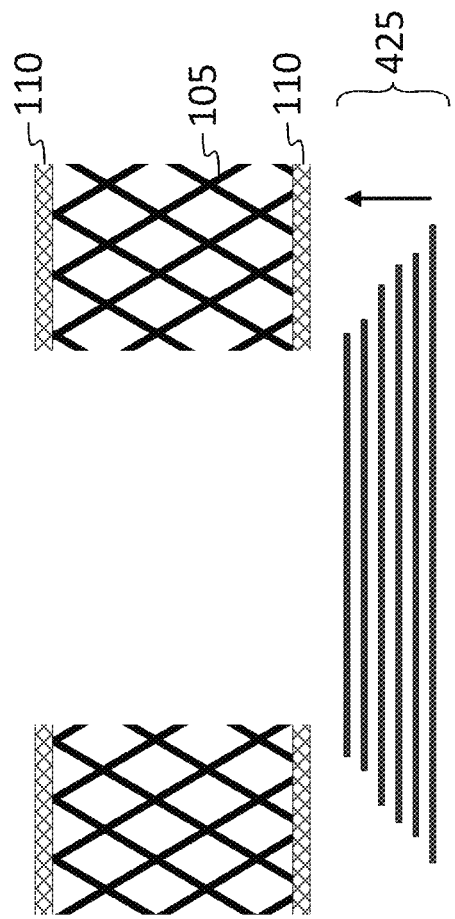
FIG. 6B is a schematic illustration of an intermediate product in a sandwich structure repair method, according to an embodiment of the present invention.
Figure 6B:
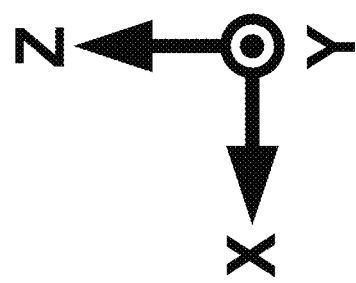
Figure 6C:
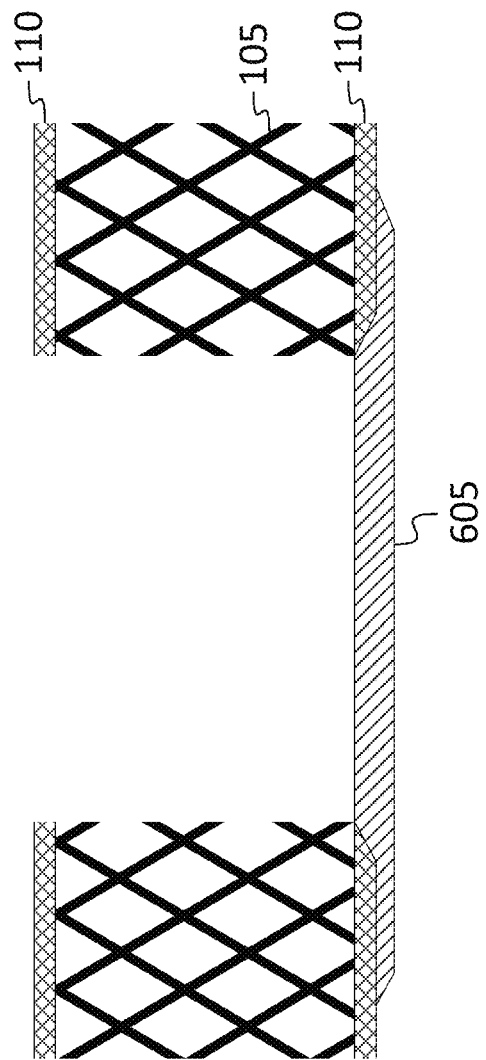
FIG. 6C is a schematic illustration of an intermediate product in a sandwich structure repair method, according to an embodiment of the present invention.

Referring to FIGS. 6A-6C, in the double-sided damage case (FIG. 2B), inelastic deformation occurs within both sandwich facesheets as well as the reinforcing core. In this scenario, there is no undamaged section of the facesheet onto which the truss structures can be formed or bonded. As such, in some embodiments a method for repairing double-sided damage begins with removing the damaged portions of the core and of both facesheets (to produce the intermediate structure of FIG. 6A), and curing, bonding or joining one facesheet repair section onto a first facesheet of the two facesheets (e.g., the lower facesheet, in FIGS. 6A-6C), e.g., in a manner analogous to that illustrated in FIGS. 4A-4C. For example a pre-cured composite skin may be secondarily bonded, e.g., with an adhesive layer, to the surrounding undamaged facesheet or the composite skin may be cured directly on the outer surface of the first facesheet, without adhesive, using a patch, formed from a plurality of uncured plies, all having substantially the same dimensions, or using a scarf 425, formed from a plurality of uncured plies, each having smaller dimensions than the one above it (FIG. 6B). Once a facesheet section 605 is in place (as shown in FIG. 6C), the in situ repair methods described above may be used.

Example 1

Figure 7A:
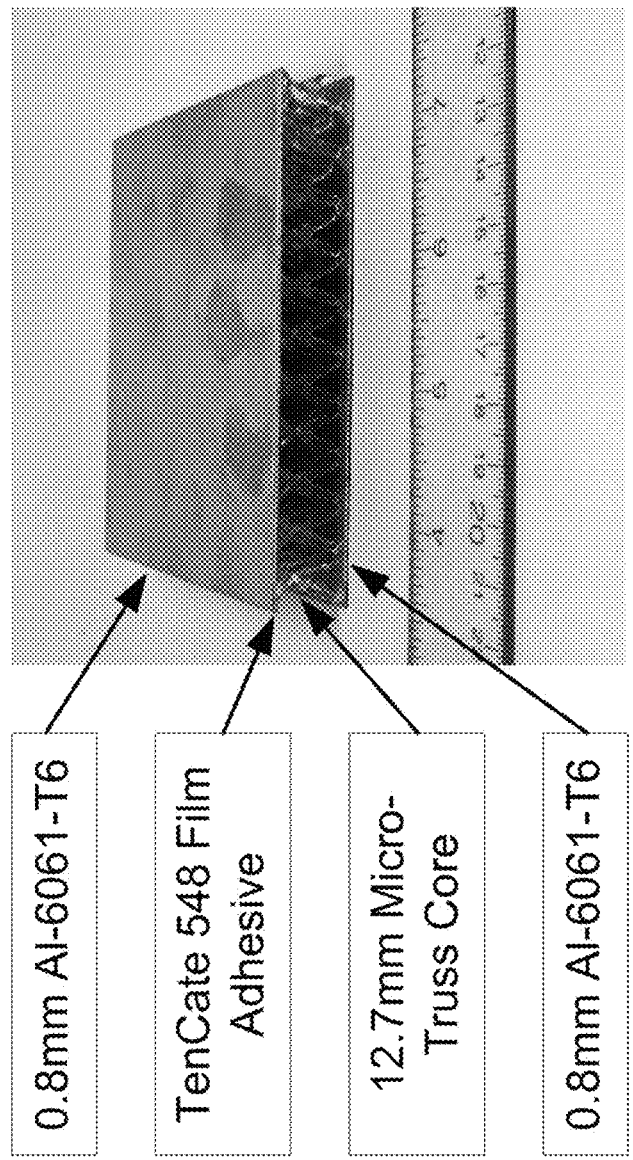
FIG. 7A is a photograph of a sandwich structure, according to an embodiment of the present invention.
Figure 7B:
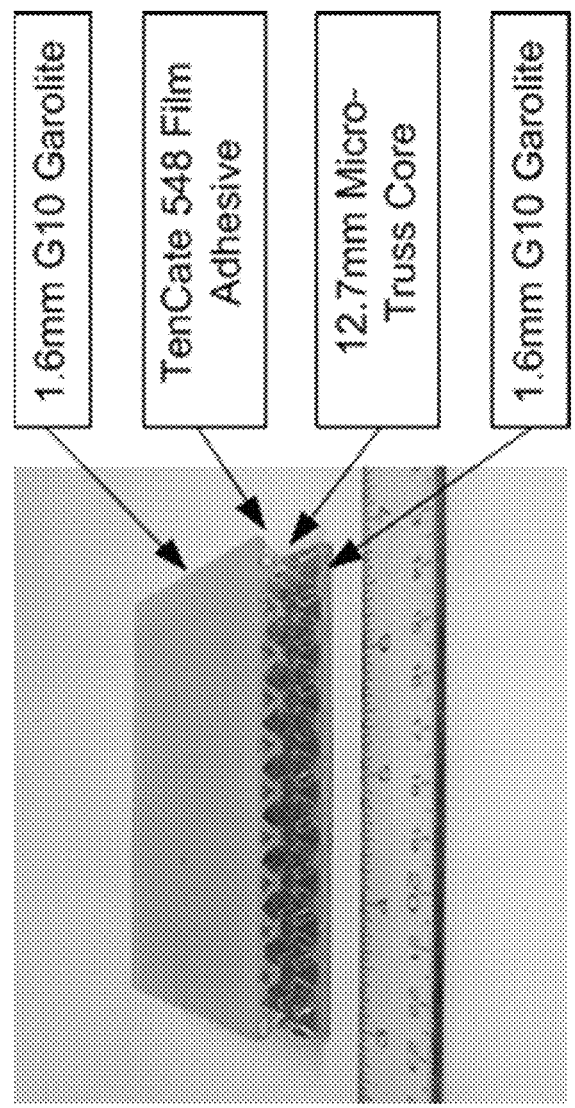
FIG. 7B is a photograph of a sandwich structure, according to an embodiment of the present invention.

Two sandwich panels, shown in FIGS. 7A-7B, incorporating self-propagating photopolymer lattice cores were fabricated and subjected to varying levels of damage. Both sandwich structures incorporated the same photopolymer lattice core, a single tetrahedral unit cell with a total thickness of 12.7 mm. The first design hereafter referred to as "Design 1", included two 0.8 mm aluminum 6061-T6 facesheets. The second design, labeled "Design 2", included two 1.6 mm quasi-isotropic glass fiber-reinforced polymer (GFRP) composite facesheets.

Each sandwich panel was then tested under standard impact conditions using a Lansmont M-23 drop-weight impact tower fitted with a 19 mm diameter hardened steel hemispherical impactor. Sandwich specimens were mounted to the base of the impact tower using a picture frame fixture which clamped two opposing edges of the specimens and left the remaining two edges free.

After introduction of damage into the panels, the residual load carrying capability of the in situ repair method was compared against that of undamaged and non-repaired panels. The control samples used for evaluation represented the high (undamaged) and low (damaged without repair) performance bounds of the repair method. Evaluation of each repair method was performed by comparing the repaired and control panels using an in-plane buckling (ASTM C364) loading condition. These in-plane buckling strength measurements are provided in FIGS. 8A and 8B for the GFRP and aluminum designs, respectively.

Figure 8B:
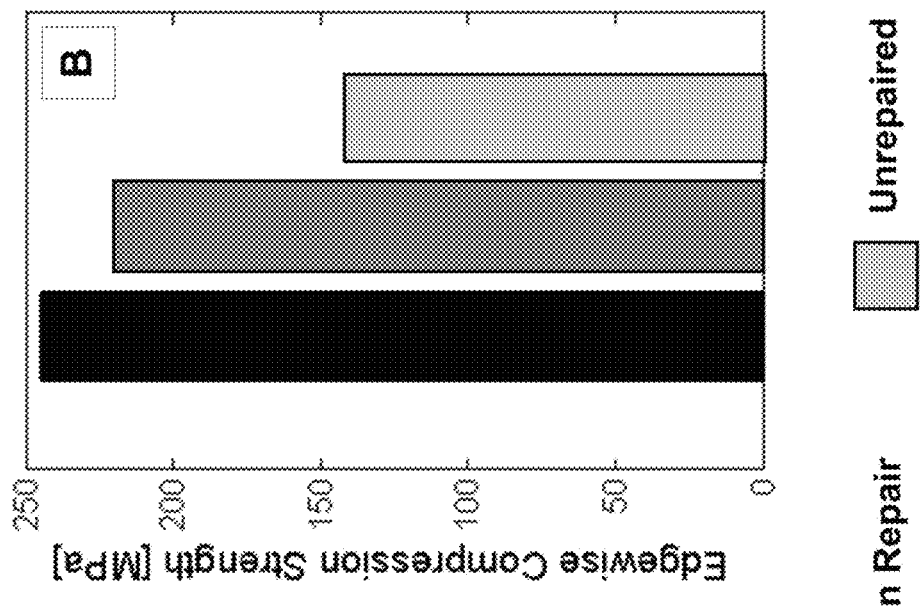
FIG. 8B is a graph of edgewise compression strength, according to an embodiment of the present invention.
Figure 8A:
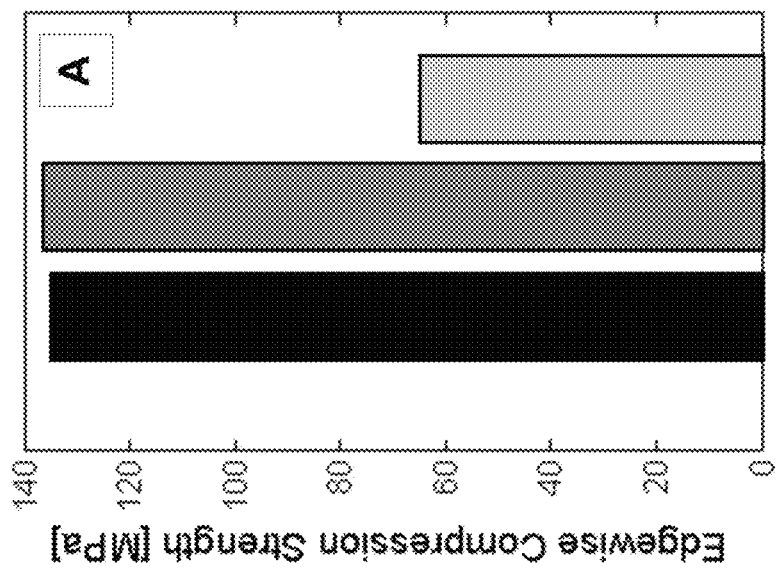
FIG. 8A is a graph of edgewise compression strength, according to an embodiment of the present invention.

From FIGS. 8A and 8B, it may be seen that a repair process according to embodiments of the present invention is highly effective at mitigating the effects of damage to the sandwich panel, resulting in repaired panels having a strength that (i) exceeds the strength of the damaged panel by between 80% and 100% or more, and (ii) is 80% to 99% or more of the strength of the undamaged panel. For both sandwich design variants, the repaired panels have a marked strength improvement compared to the damaged panels which were not repaired. Particularly, strength achieved with the in situ repair method approaches that of the undamaged panels. Given that the in situ repair method forms an excellent facesheet-to-core bond and enables shear load transfer between the undamaged and repaired sections of the core, this result is not surprising. It should be noted that the slightly higher strength observed in the in situ composite sandwich panels versus the undamaged control samples (FIG. 8A) was a result of panel-to-panel variation and the slight mass increase which occurs during repair. Regardless of the repair process implemented, it is clear from these results that embodiments of the present invention are effective at retaining the residual load-carrying capability of the sandwich following the occurrence of damage.

In the foregoing, a method for repairing a composite sandwich structure is disclosed. A damaged portion of a first facesheet of the structure is removed, forming a hole in the first facesheet. A damaged portion of the underlying core is removed to form a cavity in the sandwich. If the second facesheet is damaged, the damaged section is removed, and covered and sealed with a facesheet repair section. If the core material is an open-cell material, a dam is formed around the perimeter of the cavity, to act as a barrier between the cavity and the core material. The cavity is at least partially filled with a photomonomer resin, which then is illuminated through a mask with collimated light to form a truss structure in the cavity. Residual photomonomer resin is removed, and a facesheet repair section is bonded over the hole in the first facesheet.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of sandwich structure repair methods incorporating a lattice core material have been specifically described and illustrated herein, many modifications and variations will be apparent to those skilled in the art. Accordingly, it is to be understood that sandwich structure repair methods incorporating a lattice core material according to principles of this invention may be embodied other than as specifically described herein. The invention is also defined in the following claims, and equivalents thereof

What is claimed is:

1. A method for repairing a composite structure comprising a core attached to a first facesheet, the method comprising:

at least partially filling a cavity in the composite structure with a photomonomer resin, the cavity including a void in the core and a hole in the first facesheet, the hole opening into the void; and exposing the photomonomer resin to collimated light projected through a mask having a plurality of apertures to form a core repair section comprising a plurality of waveguide members that interpenetrate each other at a plurality of nodes to form a continuous material.

2. The method of claim 1, wherein the exposing of the photomonomer resin to collimated light comprises exposing the photomonomer resin to collimated light from three sources of collimated light.

3. The method of claim 1, further comprising, before at least partially filling the cavity in the composite structure with the photomonomer resin, forming a dam around a perimeter of the cavity to form a barrier between the cavity and the core.

4. The method of claim 3, further comprising sealing the dam against a surface of a second facesheet that is bonded to the core opposite the first facesheet.

5. The method of claim 3, further comprising sealing the dam against the first facesheet around a perimeter of the hole in the first facesheet.

6. The method of claim 1, further comprising removing uncured photomonomer resin from the cavity.

7. The method of claim 6, further comprising performing a post-curing operation on the core repair section.

8. The method of claim 7, wherein performing the post-curing operation comprises exposing the core repair section to non-collimated ultraviolet light.

9. The method of claim 7, wherein performing the post-curing operation comprises heating the core repair section.

10. The method of claim 9, wherein heating the core repair section comprises exposing the core repair section to infrared light.

11. The method of claim 1, further comprising bonding a first facesheet repair section to the first facesheet and the core repair section, covering the hole in the first facesheet.

12. The method of claim 11, wherein bonding the first facesheet repair section to the first facesheet comprises bonding a pre-cured facesheet repair section to the first facesheet and the core repair section.

13. The method of claim 12, wherein the pre-cured facesheet repair section is a pre-cured thermosetting polymer matrix composite facesheet repair section.

14. The method of claim 11, wherein the bonding of the first facesheet repair section on to the first facesheet comprises:

laying an uncured thermosetting polymer matrix composite facesheet repair section on the first facesheet on the core repair section; and curing the thermosetting polymer matrix composite facesheet repair section in place.

15. The method of claim 14, further comprising performing a post-curing operation on the core repair section, wherein the performing of the post-curing operation and the curing of the thermosetting polymer matrix composite facesheet repair section comprise concurrently heating the core repair section and the thermosetting polymer matrix composite facesheet repair section.

16. The method of claim 1, wherein the core comprises, as a major component, a material selected from the group consisting of honeycombs, open cell foams, and closed cell foams.

17. The method of claim 1, further comprising, before at least partially filling the cavity in the composite structure with the photomonomer resin:

removing damaged facesheet material and removing damaged core material to form the cavity.

18. The method of claim 17, wherein the core of the composite structure is sandwiched between the first facesheet and a second facesheet, and wherein the removing of the damaged facesheet material comprises:

removing damaged facesheet material from the first facesheet;

removing damaged material from the core to form the void; and removing damaged facesheet material from the second facesheet, to form a hole in the second facesheet opening into the void.

19. The method of claim 18, further comprising bonding a second facesheet repair section on to the second facesheet to cover and seal the hole in the second facesheet.

20. The method of claim 19, wherein the bonding of the second facesheet repair section on to the second facesheet comprises bonding a pre-cured facesheet repair section on to the second facesheet.

21. The method of claim 20, wherein the pre-cured facesheet repair section is a pre-cured thermosetting polymer matrix composite facesheet repair section.

22. The method of claim 21, wherein the bonding of the second facesheet repair section on to the second facesheet comprises:

laying an uncured thermosetting polymer matrix composite facesheet repair section on the second facesheet; and curing the thermosetting polymer matrix composite facesheet repair section in place.

* * * * *